United States Patent [19]
Kompare et al.

[11] 3,976,460
[45] Aug. 24, 1976

[54] METHOD AND APPARATUS FOR INTRODUCING A PROTECTIVE ATMOSPHERE INTO A GLASS FORMING CHAMBER

[75] Inventors: John W. Kompare; John C. Potts; James L. Simpson, all of Pittsburgh, Pa.

[73] Assignee: PPG Industries, Inc., Pittsburgh, Pa.

[22] Filed: July 16, 1975

[21] Appl. No.: 596,342

[52] U.S. Cl. ............................... 65/32; 65/65 A; 65/99 A; 65/182 R
[51] Int. Cl.[2] .......................................... C03B 18/02
[58] Field of Search......... 65/32, 65 A, 99 A, 182 R

[56] References Cited
UNITED STATES PATENTS 3,356,476   12/1967   Gulotta............................ 65/99 A X Primary Examiner—Arthur D. Kellogg
Attorney, Agent, or Firm—E. Kears Pollock

[57] ABSTRACT

The glass forming chamber in which glass is formed into a continuous sheet by floating it on the surface of molten metal is provided with a series of heat exchangers in an enclosed shell above the chamber and protective atmosphere gases are passed through these heat exchangers to preheat the atmosphere gases which are then directed through conduits into headers and distribution manifolds located within the headspace of the operating portion of the chamber in the vicinity of the glass being formed. The chamber is provided with conventional electrical heating elements connected to bus bars located within the shell containing the heat exchangers, and the heat exchangers are located close to the bus bars to extract heat from them during operation and thereby prolong their useful lives.

23 Claims, 5 Drawing Figures

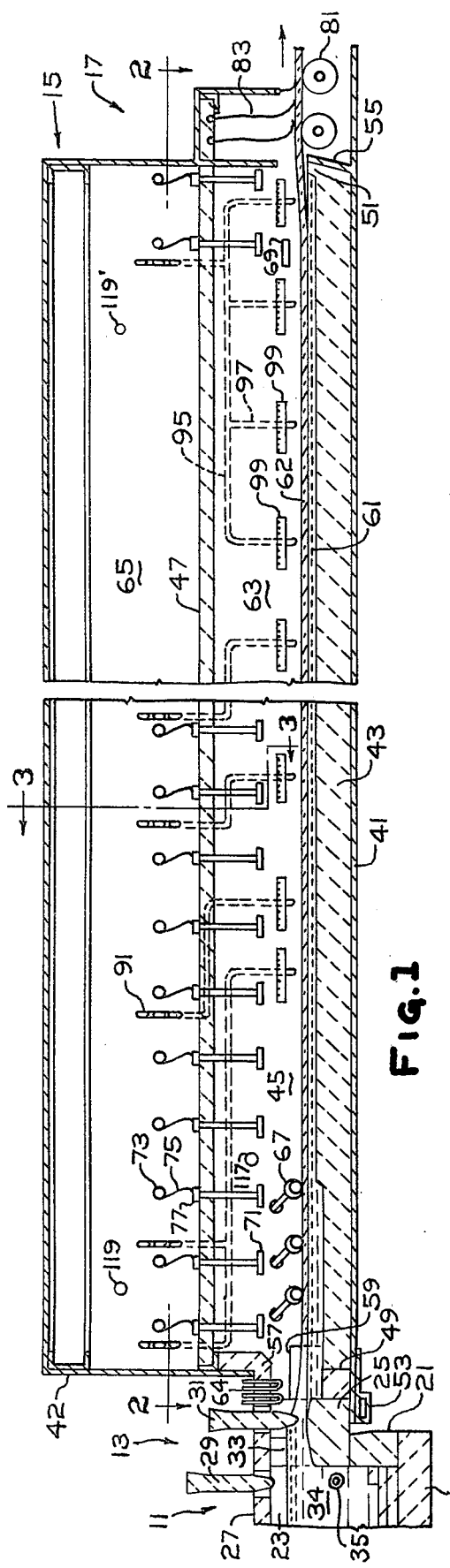
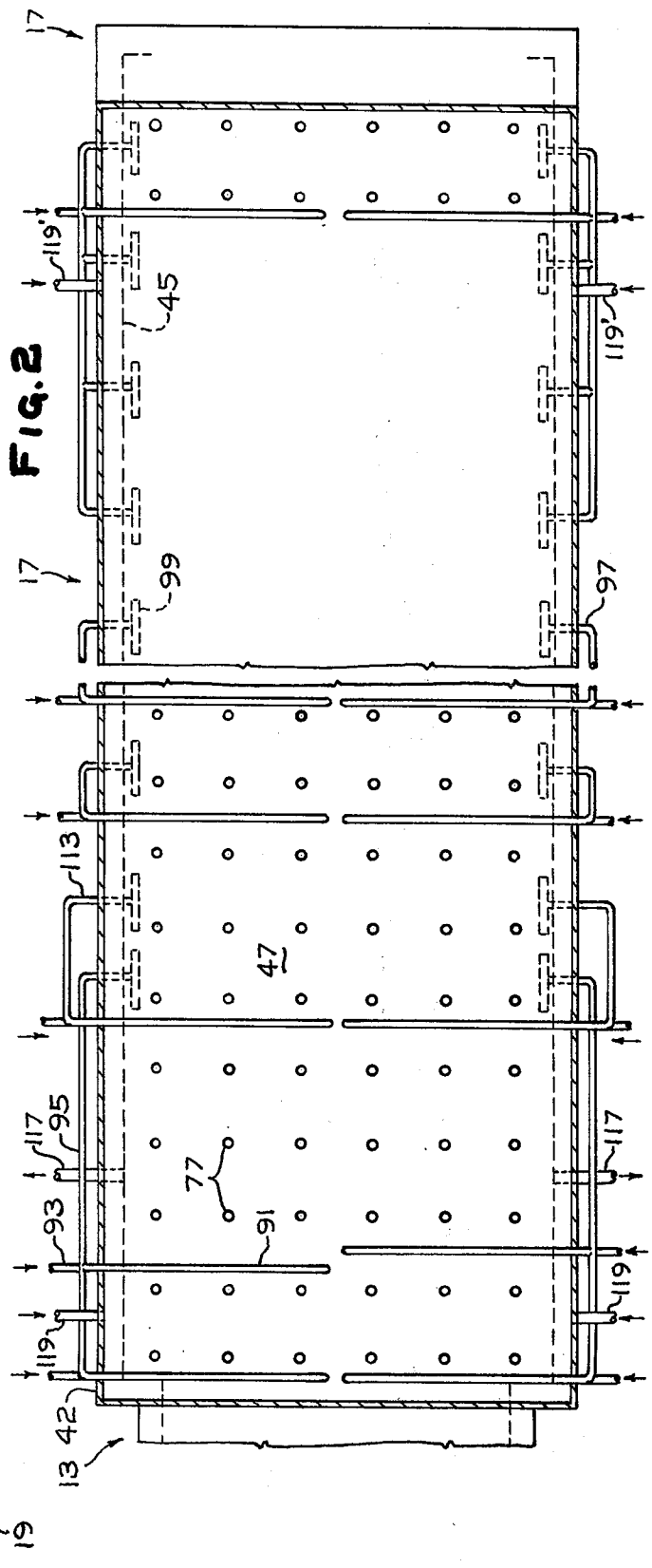

METHOD AND APPARATUS FOR INTRODUCING A PROTECTIVE ATMOSPHERE INTO A GLASS FORMING CHAMBER

BACKGROUND OF THE INVENTION

1. Field of the Invention

The present invention relates to an apparatus and method for manufacturing flat glass in which the glass is formed while being supported on the surface of a pool of molten metal. More particularly, this invention relates to an apparatus and method for introducing protective atmosphere gases into a headspace of the chamber in which the glass is formed.

2. Brief Description of the Prior Art

In a variety of processes a continuous sheet or ribbon of glass is formed while supported on and advancing along the surface of a pool of molten metal. In general, a protective nonoxidizing atmosphere is provided in a headspace above the advancing glass and the molten metal supporting it in order to prevent the oxidation of the molten metal and consequent contamination of the glass. Several patents illustrating the use of protective atmosphere to protect molten metal in this environment are U.S. Pat. No. 3,241,937 to Michalik et al; U.S. Pat. No. 3,337,322 to Taylor; U.S. Pat. No. 3,356,476 to Gulotta; U.S. Pat. No. 3,551,126 to Sacrez et al and U.S. Pat. No. 3,630,701 to Javaux et al. All of these patents show the introduction of protective atmosphere gases into a headspace overlying an advancing body of glass that is being formed into a continuous sheet and over a pool of molten metal that supports the advancing glass. The head-space into which the protective atmosphere gases are introduced is defined by the side walls and end walls of the forming chamber and by some overlying ceiling or roof spaced above the advancing glasses and its supporting metal.

As shown in U.S. Pat. No. 3,468,869 for example, electrical heating elements for controlling the temperature of the forming chamber may be mounted in the ceiling above the glass. The ceiling, which extends over the advancing glass and its supporting metal, may be separated from and enclosed within an outer shell or casing as shown in U.S. Pat. No. 3,721,543 to Classen et al. Such an arrangement is shown generally for electrically heated enclosures in U.S. Pat. No. 2,543,708 to Rice et al. The patent of Rice et al shows a double-walled furnace having an inner wall like the ceiling of a glass forming chamber made of refractory material surrounded by an outer metallic wall or casing. Electric heaters extend through the inner wall to maintain the temperature within the interior space.

According to the disclosure of Rice et al, a suitable gaseous mixture for introduction into the inside chamber defined by the inner wall is introduced into the space between the inner and outer walls and allowed to diffuse through the inner wall into the furnace. While passing through the space between the inner and outer walls, such a gas inherently removes some heat from the electric heaters and their connections to conductors located within the space between the inner wall and outer wall of the disclosed furnace or chamber.

Employment of a gas introduction method, such as disclosed by Rice et al, in a chamber for forming glass results in the introduction of atmosphere gases throughout the headspace of the forming chamber dependent upon the porosity of the ceiling extending over that headspace and separating it from an outer shell or casing surrounding the chamber. To the extent that the introduction of cool atmosphere gases into the space between the ceiling and the casing serves to cool electrical connections serving heaters which extend through the ceiling, the temperature of that space at various locations adjacent such electrical connections dictates the amount of atmosphere gases that must be introduced in order to maintain electrical connections at suitable operating temperatures. To the extent that atmosphere gases must be introduced to protect the molten metal within the chamber from oxidation at various locations along the length of the forming chamber, conditions within the headspace of the chamber itself dictate the amount of atmosphere gases which must be introduced into the chamber and the relative concentrations of protective gases which must be introduced. The two objectives of maintaining the temperature of electrical connections and maintaining suitable protective gas conditions within the headspace of the chamber are not fully compatible. It is commonly necessary to introduce an excess of atmosphere gases and an excess of reducing gases within the total flow of atmosphere gases in order to provide sufficient thermal and oxidation protection within the chamber. The present invention provides an apparatus and method for avoiding compromise of the two objectives for introducing atmosphere gases into a glass forming chamber.

SUMMARY OF THE INVENTION

A plurality of heat exchangers are provided in the upper portion of a glass forming chamber to cool electrical connections and to preheat protective atmosphere gases prior to introducing them into the chamber at selected locations, generally remote from the heat exchangers.

Protective gases such as nitrogen, forming gas, coal gas, carbon monoxide, carbon dioxide, mixtures of nitrogen and hydrogen and the like are heated and then introduced into a headspace of a glass forming chamber above a pool of molten metal in the chamber and preferably along the sides of the chamber. When a molten metal such as tin or an alloy of tin is used in the forming chamber as a support for glass during forming, a mixture of nitrogen and hydrogen is a preferred protective gas.

The protective gas is preferably introduced into the forming chamber as a gentle flow of gas directed transversely across the chamber towards its central portion and preferably along a slightly upward path toward a ceiling or roof extending over the pool of molten metal in the chamber. Such a roof provides a body to which heat is radiated from the glass and may include electric heating elements for controlling the rate and direction of heat transfer between the glass and its surroundings, including the roof and heaters. By directing the incoming protective gas slightly upwardly, the heaters and roof are continually swept clean of any particulate or fluid contaminants that might otherwise build up and then occasionally drop onto the glass. In this way the incidence of point or particle defects in the glass may be minimized without resort to the external gas cleaning systems known in the art.

It is desirable to introduce a substantial portion of the introduced protective gas at locations generally well downstream from the inlet or hot end of a forming chamber where molten glass is fed to the chamber. Preferably, a given stream or protective gas flows through a heat exchanger located at a first distance from the hot end of a forming chamber and then through a conduit which leads to a gas distribution device inside the forming chamber a second distance from the hot end of the forming chamber which is greater than the described first distance. In the vicinity of the exit or cold end of a forming chamber it is desirable to provide a heat exchanger close to the exit and to direct protective gas through it and then into the chamber at a location farther upstream from the exit than the heat exchanger. This is a different spacing than that employed generally for heat exchangers and gas distribution devices over the full length of a forming chamber, but it is a particularly useful arrangement where heaters are provided at the exit of the chamber to control the temperature of glass as it is removed from its supported molten metal.

The structural features of this invention are integrated into a glass forming chamber which includes many conventional features as well. In general, a glass forming chamber to which this invention is applied is one having an enclosed casing or shell, a liner, a pool of molten metal, a headspace, a roof or ceiling and a space above the roof but within the casing which, in a conventional chamber, serves as a plenum.

More specifically, a glass forming chamber used in the practice of this invention includes an outer shell or casing of metal (such as steel) or other impervious material. Within the bottom portion of the casing is a refractory bottom and sides for containing a pool of molten metal. The bottom may be lined with powdered graphite or like material as described in U.S. Pat. No. 3,584,475 to Galey and Sensi. Inside the chamber is a refractory ceiling or roof mounted within the upper portion of the casing and extending over the pool of molten metal. The ceiling divides the enclosed chamber into two spaces: a headspace immediately over the molten metal and below the refractory ceiling and an enclosed plenum or service space above the refractory ceiling and inside the upper portion of the chamber casing.

Extending into the headspace of the chamber through the refractory ceiling are electrical heating elements to control the temperature of glass as it advances through the forming chamber where it is formed into a continuous sheet of ribbon of glass. These electrical heating elements are connected to electrical connectors located into the service space above the ceiling. These connectors are, in turn, connected to a source of electrical power. The entire plenum or service space of the chamber is pressurized slightly to act as a seal against the ingress of oxygen or contaminants from the outside environment into the chamber.

A plurality of heat exchangers are positioned within the service space in closely spaced relation to the electrical connectors serving the heaters. The heat exchangers are provided with inlet conduits connected to a source of protective atmosphere gases. During operation, protective atmosphere gases are introduced through the heat exchangers in order to extract heat from the associated electrical connectors. This maintains the connectors at suitable operating temperatures and, thus, extends their useful lives. Connected to the outlet of each heat exchanger is a conduit which is preferably thermally insulated so that the heated atmosphere gases coming from the heat exchangers are maintained as hot as desired. These conduits are directed along the forming chamber and into the forming chamber terminating in gas distribution manifolds inside the headspace of the chamber beneath its ceiling and above the pool of molten metal in the bottom of the chamber.

The gas distribution manifolds are preferably positioned along the side walls of the chamber at locations near the exit end of the chamber and along its mid-section so that preheated atmosphere gases are introduced into what would normally be colder portions of the forming chamber. The gas distribution manifolds are preferably designed to introduce the preheated gases into the headspace in a manner so that the gases flow upwardly and inwardly across the electrical heaters in the bottom space of the ceiling in order to continuously sweep the heaters and the ceiling and maintain the chamber free of contaminants that might fall on an advancing ribbon of glass resulting in point defects in the glass.

Each of the gas distribution manifolds is preferably provided with a control device such as a control valve for regulating the flow of atmosphere gases into the chamber at selected locations along the length of the chamber. This provides one of the extremely beneficial effects of this invention, mainly the ability to selectively control the introduction of atmosphere gases into the forming chamber without indiscriminately introducing the atmosphere gases throughout the entire chamber by flow through a ceiling of indeterminate porosity throughout its length and width. By providing heat exchangers adjacent the electrical connectors in the headspace, it is possible to direct a greater flow of atmosphere gases through those heat exchangers located near the inlet or hot end of the forming chamber and less flow of atmosphere gases through the heat exchangers located at the exit or cold end of the forming chamber. Since the temperature of the electrical connectors of the hot end of the chamber tends to inherently be much higher than the temperature of the connectors of the cold end of the chamber, those connectors are normally subject to much greater deterioration of performance than the others. By practicing this invention, it is possible to keep the temperature of the electrical connectors at the hot end of the forming chamber sufficiently low so that they do not deteriorate sufficiently over the life of a forming chamber to noticeably degrade their performance as it is possible when employing an apparatus such as conventionally used.

It is possible, if additional cooling of bus bars is desired, to provide additional heat exchangers in the vicinity of the electrical connectors which are provided with coolant that is not to be directed into the forming chamber itself. For example, even water may be used as a coolant in such heat exchangers to specifically and efficiently reduce the temperature in the vicinity of electrical connectors in the hot end of a forming chamber. A protective nonoxidizing gas may be fed through such additional heat exchangers and then directed through external cooling means, such as a refrigeration unit, and recirculated through the such exchangers located in service space of the forming chamber. It is also possible to connect the outlet conduit from the heat exchanger in the service space of the forming chamber to observation windows in the forming chamber side walls such as described by Hughes, Cramer or Jago et al in their respective patents, U.S. Pat. No. 3,387,551, U.S. Pat. No. 3,725,028 and U.S. Pat. No. 3,473,905.

In the practice of this invention, the protective atmosphere gases introduced into the headspace of a forming chamber are selectively preheated and controllably introduced into the chamber headspace so that their flow may be varied substantially for desired control effects upon the process. This may be done without regard to adjusting the flow solely to provide for a purging and sealing action of the chamber casing as provided for in the method and apparatus of Rice et al.

This invention may be further appreciated from the drawings accompanying this description.

BRIEF DESCRIPTION OF THE DRAWINGS

FIG. 1 is a sectional view of a longitudinal elevation of a glass forming chamber according to this invention;

FIG. 2 is a sectional plan view of the forming chamber shown in FIG. 1 taken along section lines 2—2;

DESCRIPTION OF THE PREFERRED EMBODIMENTS

Figure 3:
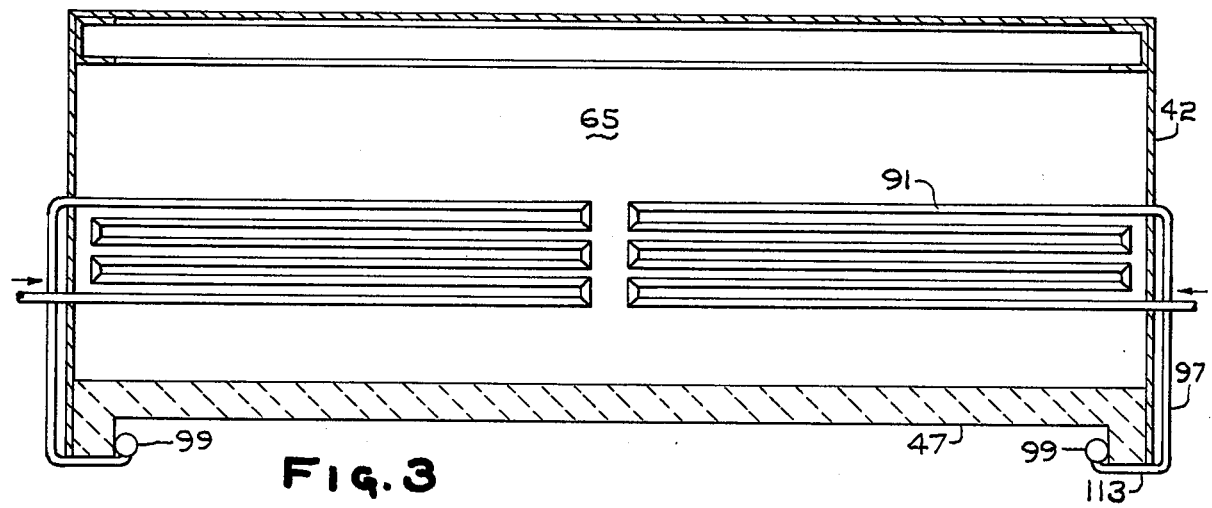
FIG. 3 is a partial sectional view of a transverse elevation of the forming chamber shown in FIG. 1 taken along section lines 3—3.
Figure 5:
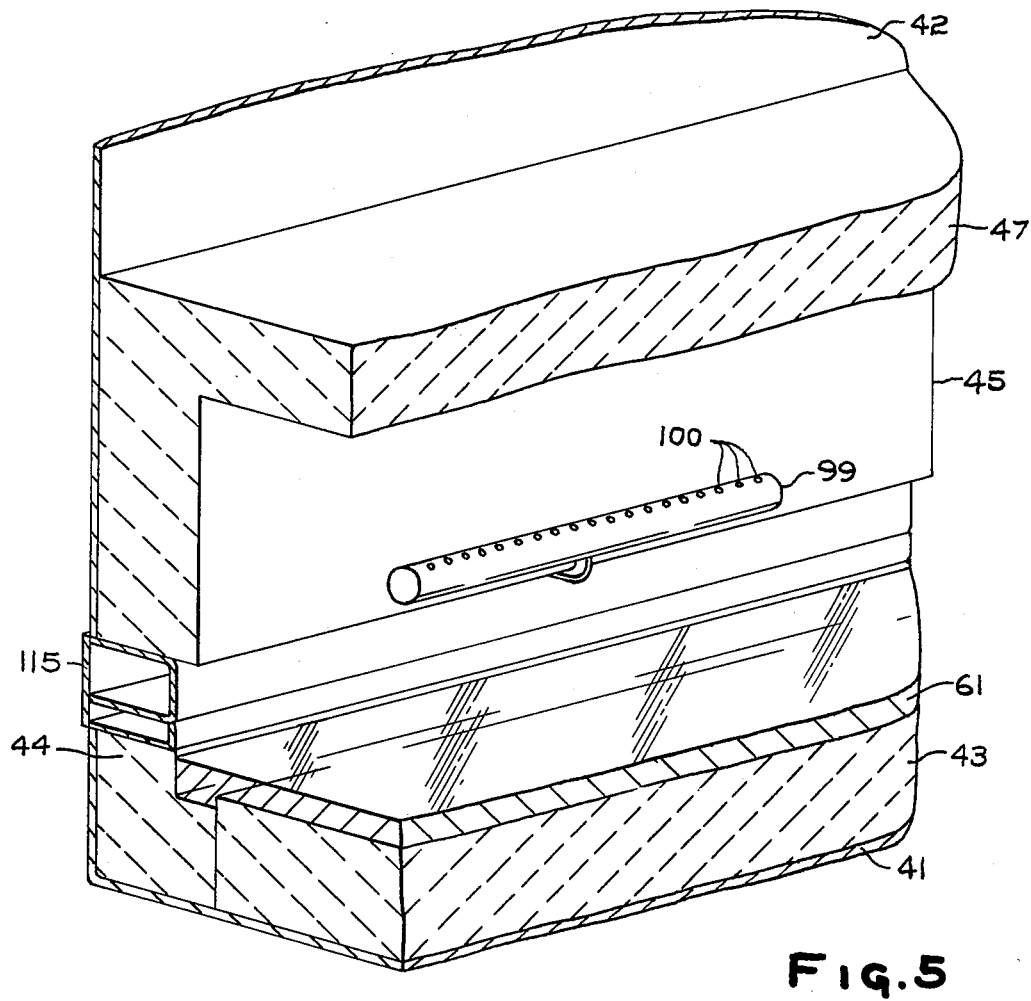
FIG. 5 is a partial sectional view in perspective of a portion of the forming chamber shown in FIG. 1 illustrating detailed aspects of a gas distribution manifold employed in the practice of this invention.

A glassmaking furnace 11 having a melter to which glassmaking materials may be fed and in which they are melted to make molten glass and a refiner in which the molten glass is cooled, refined and conditioned for delivery for forming is connected to a glass delivery facility 13. A glass forming chamber 15 is connected to the molten glass delivery facility 13. The glass forming chamber 15 extends from its inlet end or hot end where it is connected to the glass delivery means 13 to an outlet, exit, or cold end where a facility 17 for removing glass from the chamber is provided.

The glassmaking furnace 11 includes at its discharge end, which is shown in FIG. 1, a furnace bottom 19, a furnace front basin wall 21 and furnace side walls 23, which together form a container for containing molten glass as it is refined and conditioned for delivery.

The molten glass delivery facility 13 includes a threshold 25 resting on the furnace front basin wall 21. A roof 27, preferably of flat arch construction, extends from the glassmaking furnace over the end of the discharge end of the refiner and over the threshold 25 of the delivery facility 13. Extending transversely across the delivery facility and mounted in a manner so that it can be moved upwardly or downwardly into contact with molten glass in the discharge end of the refiner is a shutoff device or tweel 29 referred to as a backup tweel. Extending transversely across the delivery facility 13 and directly over the threshold 25 is an operating tweel 31 used to meter flow of molten glass over the threshold 25. The delivery facility further includes side jambs 33 which together with the threshold 25 and the operating tweel 31 define an opening through which molten glass flows during operation.

Within the refiner of the glassmaking furnace 11 and extending and flowing over the upstream portion of the threshold 25 is a pool of molten glass 34. The apparatus is preferably provided with a cooler 35 submerged in the pool of molten glass and extending transversely across the discharge end of the refiner as taught in U.S. Pat. No. 3,843,346. Such a cooler 35 may be used to assist in establishing favorable thermal conditions for enhancing the flow of molten glass from the pool of molten glass 34 over the threshold 25 and into the forming chamber 15. Whether or not a cooler 35 is employed, it is desirable to provide a stepped bottom in the refiner of the glassmaking furnace 11 as taught in U.S. Pat. No. 3,843,346, for such an arrangement assists in cooling the molten glass approaching its delivery facility and accelerating its flow toward it near the surface of the pool of molten glass 34.

Moving on downstream through the apparatus and noting the various features of the forming chamber 15, it may be seen that the forming chamber includes a bottom casing 41 and an upper casing 42. These casings 41 and 42 form a box-like shell which surrounds the forming chamber. The casings 41 and 42 are preferably impervious material which is not readily penetrated by either a molten metal, such as tin, or gases, such as air, from the outside environment. Within the bottom casing 41 is a bottom liner 43, preferably comprising a refractory material, and bottom side walls 44, also preferably comprising refractory materials. The upper casing 42 includes upper side walls 45 and a ceiling 47 mounted above the side walls 45 and extending over the bottom portion of the forming chamber. The bottom portion of the forming chamber further includes an exit lip 51 which together with the bottom side walls 44, the threshold 25 and the chamber bottom 43 provides a container for holding a pool of molten metal as discussed below.

At the inlet end of the forming chamber beneath the threshold 25 there is provided a casing cooler and seal 53 which bonds the threshold 25 to the bottom of the forming chamber 43 and insures against potential leakage of molten metal from the forming chamber. Mounted downstream of the exit lip 51 is an exit lip casing 55 which may or may not be cooled in a conventional manner as desired. Extending transversely across the inlet end of the forming chamber downstream of the operating tweel and above the bottom of the forming chamber 43 is a lintel 57 which is employed to connect and seal the upper portion of the forming chamber to the roof 27 of the delivery facility.

At the inlet end of the forming chamber there are guides 59 which extend downstream a short distance from the jambs 33 and serve to establish and maintain the width of a delivered layer of molten glass immediately upon its delivery to the forming chamber. A pool of molten metal, preferably molten tin, 61 is provided within the bottom portion of the forming chamber in the container formed by the threshold 25, the bottom 43, the bottom side walls 44 and the exit lip 51. It is on this pool of molten tin 61 that molten glass is delivered, cooled and formed into a continuous ribbon or sheet of flat glass 62. In FIG. 1 such a continuous sheet of glass 62 is seen advancing along the surface of the pool of molten tin 61.

The space provided between the pool of molten metal 61 or the glass 62 supported on it and the ceiling 47 of the forming chamber is referred to as a headspace 63. At the inlet end of the forming chamber it may be desirable to include heaters 64 or like device such as a reflector to initially retard the rate of heat transfer from the delivered glass during its initial residence on the molten tin 61 prior to being formed to a finished sheet of flat glass.

Looking now at the main portion of the forming chamber from the guides 59 downstream through to the end of the chamber, it is seen that the upper portion of the chamber includes, in addition to the headspace 63, a plenum or service space 65 above the ceiling 47 but within the upper casing 42. Just downstream of the guides 59 and within the headspace 63 of the chamber there are provided elements for controlling the formation of a continuous sheet of flat glass. These include edge rolls 67 or other means for grasping the edges of an advancing body of glass and applying outward tractive forces to the glass. Tractive forces when applied to the glass are useful for attenuating it or stretching it to a desired width and thickness. There are also provided coolers 69 or the like for selectively extracting heat from the glass particularly as it advances toward the exit or cold end of the forming chamber. Also provided within the headspace 63 of the forming chamber are electric heating elements 71 which extend into the headspace and which are used to control the rate and direction of radiant heat transfer between the glass and its surroundings. Heaters are also conveniently located near the exit or cold end of the forming chamber in order to selectively adjust and maintain the temperature of glass as it is prepared for removal from the molten metal and withdrawal from the forming chamber.

Figure 4:
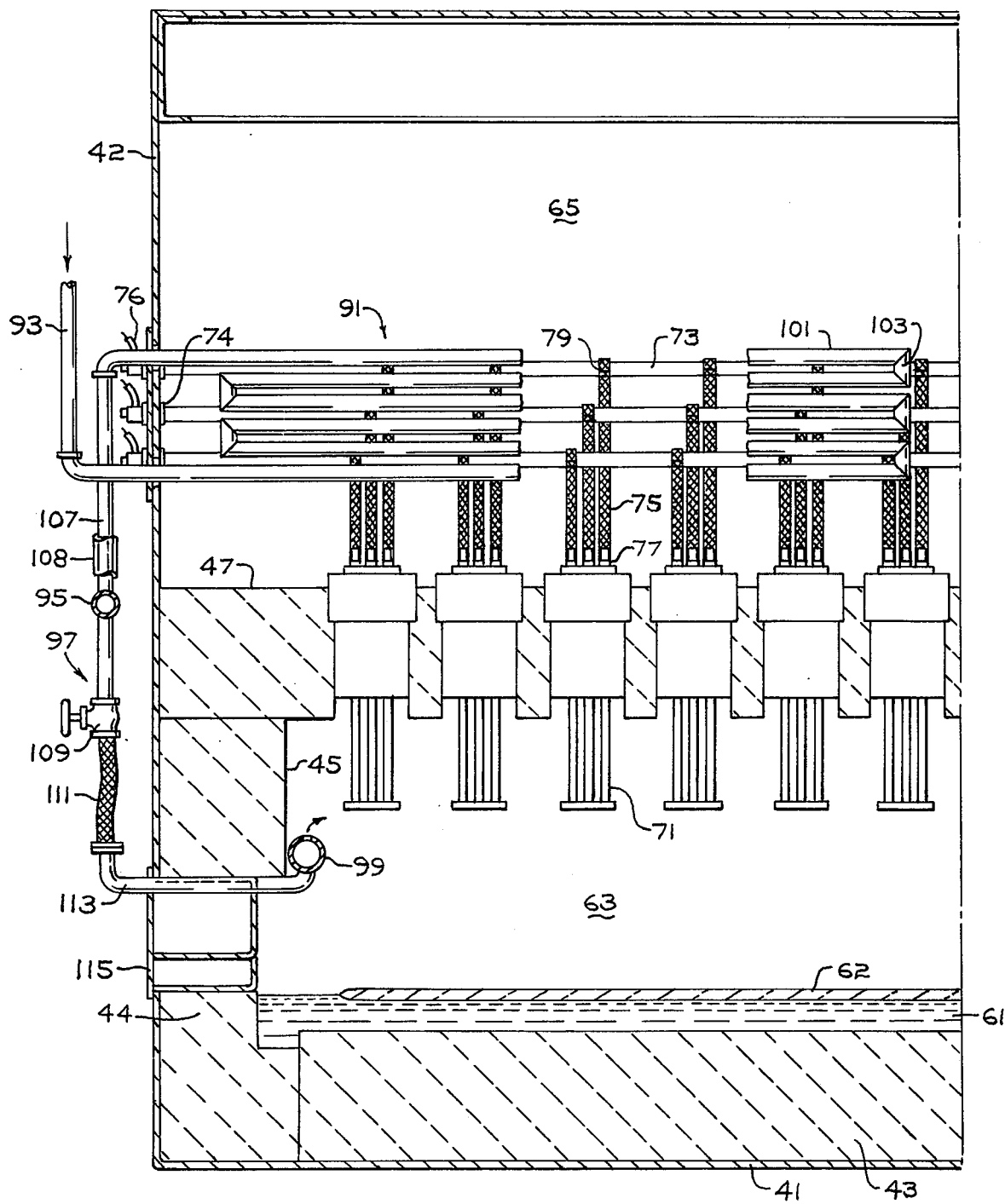
FIG. 4 is a partial half-sectional view of a transverse elevation of the forming chamber shown in FIG. 1 showing the details of the electrical connector arrangement in association with the heat exchangers employed in this invention.

The heaters 71 extend through and are supported by the ceiling 47. As shown in detail in FIG. 4, they are connected to bus bars 73 which extend through electrically insulated collars 74 mounted in the upper casing 42 and are connected to a source of electric power (not shown). The heaters 71 are connected to the bus bars 73 by connecting straps 75 and electric power is provided to the bus bars by power cables 76. The connecting straps 75 are connected to the heaters and the bus bars respectively by the connectors 77 and 79.

Moving to the exit end of the forming chamber as shown in FIG. 1, the glass withdrawal means 17 is seen to include liftout rolls 81 which are used to support, lift and apply traction to a continuous sheet of glass that has been formed in the forming chamber and to convey the sheet of glass from its supporting pool of molten metal and outwardly from the forming chamber. Mounted in the upper portion of the glass withdrawal facility 17 are drapes 83 or other convenient sealing members to prevent the ingress of unwanted air from the outside environment which could serve to oxidize molten metal in the forming chamber.

The novel aspects of present invention may be appreciated within the context of the already described apparatus with reference to FIGS. 1 through 5. Mounted within the plenum or service space 65 of the forming chamber 15 are heat exchangers 91. The heat exchangers 91 are connected to inlet conduits 93, and longitudinal conduits 95 run from the heat exchangers 91 to distribution line 97 which connect to gas distribution headers or manifolds 99 within the headspace 63 of the forming chamber. The gas distribution headers 99 are provided with orifices 100, and a protective gas introduced through the heat exchangers 91 and ultimately to the headers 99 is distributed through these orifices into the headspace 63.

The heat exchangers 91 include several passes including comprising transverse runs 101 connected by U-turn members 103. In a preferred embodiment the detailed elements of a conduit connecting the heat exchangers 91 with the gas distribution headers 99 include for each heat exchanger: an outlet conduit 107, which may be partially or fully insulated with thermal insulation 108, connected to a longitudinal conduit 95 which is, in turn, connected to a distribution line 97 which includes a control valve 109, a flexible connector 111 and a gas feed line 113 extending through a side seal 115 joining the upper casing 42 and its side wall 45 with the bottom casing 41 and its side wall 44.

In a preferred embodiment of this invention, the entire conduit from the outlet of each heat exchanger to the gas distribution header or at least to the point of entry of the gas feed line through the side wall of the forming chamber is provided with thermal insulation 108 so that the heat acquired by the protective gas passing through the heat exchangers 91 is maintained until the gas can be distributed into the headspace 63 of the forming chamber.

The forming chamber may be provided with atmosphere discharge outlets or vents 117 for continuously or intermittently discharging atmosphere gases from the headspace of the chamber. The chamber may also be provided with conventional protective gas inlet conduits 119 connected to the chamber through its upper casing. While in conventional practice all protective gas entering the chamber, except through windows and seals, is directed into the upper portion of the chamber, only a limited amount is introduced in this manner when practicing the preferred embodiments of this invention. A sufficient amount of gas is introduced through the conduits 119 to slightly pressurize and seal the service space of the chamber. This presents uncontrolled flow of gases from the headspace into the service space. Such gases contain contaminants acquired through contact with the molten metal and molten glass and they can have a detrimental effect upon refractories and equipment in the service space if allowed to freely flow through the ceiling from the headspace to the service space.

The invention will be further appreciated from the examples which follow.

In a forming chamber, such as already described, there are provided 17 gas distribution headers or manifolds along each side. These are connected to nine pairs of heat exchangers located in the service space of the chamber. As shown in the drawings, one, two or three gas distribution headers are connected to each heat exchanger. The chamber is operated to make a continuous sheet of glass over 13 feet wide (slightly greater than 4 meters wide) at a rate of over 500 tons per day. Electrical heaters in the ceiling of the chamber are energized through the bus bars in the service space with a total distribution of about 650 kilowatts (6.5 $\times 10^5$ joules/sec).

A mixture of nitrogen and hydrogen, about four percent hydrogen, is directed through the heat exchangers at a rate of about 16 to 20 MSCFH (thousand standard cubic feet per hour) and then into the headspace of the chamber through the gas distribution headers. The preheated gas is heated to about 150°F. (65°C.) prior to being directed from the distribution headers into the headspace of the chamber. The gas flowing from the distribution headers flows through orifices which direct it upwardly and inwardly toward the center of the chamber. Thus, the gas is further heated by the heaters and ceiling as it enters the headspace and before it flows downwardly into contact with the glass.

Using thermocouple probes, the temperatures of the atmosphere gases beneath the distribution header orifices and above the glass are measured and the glass temperatures are also measured at several points along the length of the chamber. In general, the temperature of the gases in the atmosphere is kept within from 50°F. to 100°F. (28 to 55°C.) of the temperature of the glass beneath each of the locations at which the atmosphere temperatures are measured. However, the temperature difference may be permitted to reach 150°F. (83°C.) without serious detriment, particularly at locations in the chamber remote from its inlet end. It has also been possible to operate with glass-to-atmosphere temperature differences of less than 10°F. (5°C.) and even to operate under conditions wherein the atmosphere is hotter than the glass at or near the outlet or exit end of the chamber.

As a result of maintaining closely related glass and atmosphere temperatures, too rapid surface cooling of the glass by convection is avoided with a consequential enhancement of glass quality as top surface optical distortion is further reduced.

The flow of gas to the distribution headers is adjusted to balance the heat transfer along both sides of the forming chamber and to control the cooling of the glass advancing through the chamber. As the controlled flow of protective gases enter the chamber headspace from the gas distribution headers, sufficient protective gas, generally of the same composition as that directed through the headers, is fed to the service space or plenum of the chamber to slightly pressurize and seal it in the manner of Rice et al. This sealing gas flow may be adjusted to be as high as 60 to 70 percent of the total amount of protective gas introduced into the chamber but preferably comprises less than half of the gas introduced. As described in the copending application of J. A. Gutolla, filed on even date herewith, the service flow of protective gas may beneficially be a less reducing gas than the controlled flow through the heat exchangers and into the headspace.

In further examples the operating conditions are maintained except the hydrogen content of the reducing protective gas is increased to 6 percent and 10 percent respectively. While the thermal efficiencies evident in the first example are again evident in these examples, the increased presence of hydrogen did not appear to change the observed operating conditions or the quality of the glass produced. Throughout all examples the tin was maintained in a sufficiently clean (free of oxide) condition so that little pick-up of tin oxide by the glass was noted.

While this invention has been described by reference to specific embodiments of it, those skilled in the art will recognize that variations may be made from those specific embodiments without departing from the spirit of this invention. Accordingly, the scope of this invention is not to be construed as being limited to its disclosed specific embodiments. Rather, the invention is defined by the following claims.

We claim:

1. In the method of making flat glass wherein molten glass is delivered onto the surface of a pool of molten metal in an enclosed chamber that includes a ceiling separating the chamber into two enclosed spaces, a headspace below the ceiling and a service space above the ceiling, and is advanced as a layer along the surface of the pool of molten metal while being cooled and formed into a dimensionally stable, continuous sheet of glass which is withdrawn from the pool of molten metal and from the enclosed chamber and wherein a protective atmosphere gas is introduced into the chamber in the headspace extending over the advancing glass and the pool of molten metal and wherein heat is supplied in said headspace from heaters while the service space above them inherently receives heat, the improvement comprising directing a portion of the introduced protective gas through a heat exchanger located inside the service space of the chamber and closely spaced in effective heat exchange relation to a first portion of the service space of the chamber which is substantially hotter than a second portion of the service space of the chamber and then distributing a substantial amount of the introduced protective gas that has been directed through the heat exchanger in the first portion of the service space of the chamber into the headspace of the chamber at a location beneath the second portion of the service space of the chamber whereby a hotter portion of the service space is cooled while heat removed therefrom is directed into a location of the headspace of the chamber beneath a colder portion of the service space.

2. The method according to claim 1 wherein the protective gas is distributed into the headspace of the chamber from along its sides as a flow of gas over the glass and transverse to the direction of glass advance.

3. The method according to claim 2 wherein the protective gas is distributed into the headspace of the chamber as a flow having a sufficient upward component to provide for any appreciable force associated with such flow to be dissipated within the headspace of the chamber away from the surface of the glass.

4. The method according to claim 1 wherein the first portion of the service space of the chamber is provided with electrical connectors serving heaters extending through the ceiling into the headspace and heat exchange with the protective gas passing through the heat exchanger is sufficient to cool the electrical connectors in the first position of the service space of the chamber.

5. The method according to claim 1 wherein a greater amount of heated protective gras is distributed into the headspace of the chamber at locations remote from where glass is delivered to the chamber than at locations close to where glass is delivered to the chamber.

6. The method according to claim 5 wherein gas from the headspace of the chamber is withdrawn from the chamber.

7. The method according to claim 6 wherein the gas which is withdrawn is withdrawn at a location between where glass is delivered to the chamber and at a location at which protective gas is distributed into the headspace of the chamber.

8. The method according to claim 1 wherein the rate of distribution of heated protective gas into the headspace of the chamber is controlled at a plurality of locations along the length of the chamber between where glass is delivered to the chamber and where glass is withdrawn from the chamber.

9. The method according to claim 1 wherein the rate of distribution of heated protective gas into the headspace of the chamber is separately controlled along each side of the chamber.

10. In an apparatus for making flat glass comprising an enclosed chamber having an outer casing, a liner within the bottom portion of the casing containing a pool of molten metal, a ceiling disposed within the chamber and separating it into two spaces, a headspace beneath the ceiling and above the pool of molten metal and a service space above the ceiling and inside the outer casing, wherein heaters are mounted within the headspace of the chamber in spaced facing relation to the pool of molten metal, which heaters are connected to power connectors mounted within the service space of the chamber, the improvement comprising a heat exchanger having an inlet and an outlet positioned within the service space of the chamber in closely spaced relation to a power connector an inlet conduit for supplying a protective gas to the chamber connected to the inlet of the heat exchanger an outlet conduit for carrying the protective gas from the heat exchanger to the headspace of the chamber connected to the outlet of the heat exchanger gas distribution means for distributing the protective gas into the headspace of the chamber connected to the outlet conduit and mounted inside the headspace of the chamber.

11. The apparatus according to claim 10 wherein the gas distribution means comprises a hollow elongated member having a plurality of orifices along its length and being mounted inside the headspace of the chamber along a side thereof.

12. The apparatus according to claim 10 wherein the outlet conduit is provided with means for adjusting the flow of protective gas to the gas distribution means.

13. The apparatus according to claim 10 wherein the outlet conduit is at least partially thermally insulated.

14. The apparatus according to claim 10 wherein the power connectors comprise bus bars and flexible electrical conductors connected to the bus bars and to the heaters and wherein the heat exchangers are mounted in facing relation to a plurality of such bus bars.

15. The apparatus according to claim 10 wherein the heat exchanger extends transversely across at least a portion of the service space.

16. The apparatus according to claim 15 wherein the heat exchanger extends transversely across a portion of the service space between a side wall and the center of the chamber and wherein the outlet conduit connected to the heat exchanger and the gas distribution means connected to the outlet conduit are operatively connected to the chamber along the same side of the chamber in which the heat exchanger extends with the gas distribution means being mounted in the headspace of that side of the chamber.

17. In an apparatus for making flat glass comprising an enclosed chamber having an outer casing, a liner within the bottom portion of the casing containing a pool of molten metal, a ceiling disposed within the chamber and separating it into two spaces, a headspace beneath the ceiling and above the pool of molten metal and a service space above the ceiling and inside the outer casing, wherein heaters are mounted within the headspace of the chamber in spaced facing relation to the pool of molten metal, which heaters are connected to power connectors mounted within the service space of the chamber, the improvement comprising a plurality of heat exchangers, each having an inlet and an outlet, positioned within the service space of the chamber, an inlet conduit for supplying a protective gas to the chamber connected to the inlet of each heat exchanger, an outlet conduit for carrying the protective gas from a heat exchanger to the headspace of the chamber connected to the outlet of each heat exchanger, at least one gas distribution means for distributing the protective gas into the headspace of the chamber connected to each outlet conduit and mounted inside the headspace of the chamber.

18. The apparatus according to claim 17 wherein the individual heat exchangers are mounted in the service space in positions extending at least partially transversely across the width of the chamber between its side walls.

19. The apparatus according to claim 18 wherein the power connectors comprise a plurality of bus bars extending transversely across the service space of the chamber at a plurality of locations along the length of the chamber and, connected to the bus bars, flexible electrical connectors connected to electrical heaters mounted in the headspace of the chamber, and wherein the heat exchangers are mounted between adjacent bus bars spaced along the length of the chamber.

20. The apparatus according to claim 17 wherein heat exchangers are mounted in the service space of the chamber at least in the upstream portion of the chamber adjacent where glass is delivered to the chamber and extending along the length of the chamber over the region in which advancing glass is decreasing from its delivered thickness to an equilibrium thickness.

21. The apparatus according to claim 17 wherein each heat exchanger extends transversely across about half the width of the chamber and is connected to an outlet conduit on one side of the chamber and wherein a plurality of pairs of such heat exchangers are mounted in the service space of the chamber at discrete locations along its length.

22. The apparatus according to claim 21 wherein the two heat exchangers comprising a pair of heat exchangers are mounted in alignment with one another.

23. The apparatus according to claim 21 wherein the two heat exchangers comprising a pair of heat exchangers are mounted offset from one another.

* * * * *

UNITED STATES PATENT AND TRADEMARK OFFICE
CERTIFICATE OF CORRECTION

PATENT NO. : 3,976,460

DATED : August 24, 1976

INVENTOR(S) : John W. Kompare, John C. Potts and James L. Simpson

It is certified that error appears in the above-identified patent and that said Letters Patent are hereby corrected as shown below:

Column 10, line 42, "position" should be --portion--.

Column 10, line 44, "gras" should be --gas--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*